(12) United States Patent
Xie et al.

(10) Patent No.: US 11,893,436 B2
(45) Date of Patent: Feb. 6, 2024

(54) MEMORY CARD IDENTIFICATION METHOD AND MOBILE DEVICE

(71) Applicant: Huawei Technologies Co., Ltd., Shenzhen (CN)

(72) Inventors: Lingcong Xie, Shenzhen (CN); Dan Guo, Shenzhen (CN); Enhua Deng, Shenzhen (CN); Zhixiong Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 275 days.

(21) Appl. No.: 17/417,705

(22) PCT Filed: Jul. 17, 2019

(86) PCT No.: PCT/CN2019/096438
§ 371 (c)(1),
(2) Date: Jun. 23, 2021

(87) PCT Pub. No.: WO2020/134040
PCT Pub. Date: Jul. 2, 2020

(65) Prior Publication Data
US 2022/0076090 A1    Mar. 10, 2022

(30) Foreign Application Priority Data

Dec. 24, 2018 (CN) .......................... 201811585279.9

(51) Int. Cl.
*G06K 19/07* (2006.01)
*G06F 13/10* (2006.01)
(Continued)

(52) U.S. Cl.
CPC ....... *G06K 19/0722* (2013.01); *G06F 13/102* (2013.01); *G06F 13/385* (2013.01);
(Continued)

(58) Field of Classification Search
CPC ............ G06K 19/0722; G06K 7/0052; G06K 19/07732; G06K 19/07743; G06K 7/0013; G06F 13/102; G06F 13/385
See application file for complete search history.

(56) References Cited

U.S. PATENT DOCUMENTS 7,222,205 B2 *  5/2007  Jones .................... G06F 13/387
                                                        710/301
7,254,650 B2    8/2007  Lin et al.
(Continued)

FOREIGN PATENT DOCUMENTS

CN          101483939 A        7/2009
CN          101739222 A        6/2010
(Continued)

*Primary Examiner* — Tuyen K Vo
(74) *Attorney, Agent, or Firm* — Slater Matsil, LLP

(57) ABSTRACT

A memory card identification method and a mobile device are provided. The memory card identification method includes: sending an initialization command of a first-type memory card communications protocol to a to-be-identified memory card; detecting whether there is a response in a command pin of the memory card; and identifying the memory card as a first-type memory card or a second-type memory card based on a response status of the command pin.

18 Claims, 4 Drawing Sheets

(51) Int. Cl.
   *G06F 13/38*    (2006.01)
   *G06K 7/00*     (2006.01)
   *G06K 19/077*   (2006.01)

(52) U.S. Cl.
   CPC ..... *G06K 7/0052* (2013.01); *G06K 19/07732* (2013.01); *G06K 19/07743* (2013.01)

(56) References Cited

U.S. PATENT DOCUMENTS

| | | | |
|---|---|---|---|
| 2003/0041203 A1* | 2/2003 | Jones | G06K 7/0073 710/301 |
| 2003/0140186 A1* | 7/2003 | Lai | G06K 7/0069 710/16 |
| 2004/0202015 A1* | 10/2004 | Tai | G06F 11/2221 714/E11.207 |
| 2005/0182881 A1 | 8/2005 | Chou et al. | |
| 2005/0251593 A1 | 11/2005 | Lin et al. | |
| 2006/0015676 A1* | 1/2006 | Oribe | G06F 3/0679 711/159 |
| 2006/0218324 A1* | 9/2006 | Zayas | G06F 13/385 710/65 |
| 2007/0168652 A1* | 7/2007 | Mylly | G06F 9/4401 713/2 |
| 2007/0274033 A1* | 11/2007 | Hwang | G06F 1/186 361/730 |
| 2008/0114935 A1 | 5/2008 | Jeong | |
| 2010/0131707 A1* | 5/2010 | Chi | G06F 13/385 711/E12.001 |
| 2014/0059656 A1* | 2/2014 | Maeda | G06F 3/0679 726/4 |
| 2016/0113142 A1* | 4/2016 | Moon | H05K 7/1402 361/807 |
| 2019/0042805 A1* | 2/2019 | Desai | G06F 21/57 |
| 2019/0163659 A1* | 5/2019 | Pinder | G06K 19/07 |

FOREIGN PATENT DOCUMENTS

| | | |
|---|---|---|
| CN | 101986327 A | 3/2011 |
| CN | 102253809 A | 11/2011 |
| CN | 102395980 A | 3/2012 |
| CN | 103034597 A | 4/2013 |
| CN | 103310175 A | 9/2013 |
| CN | 106776383 A | 5/2017 |
| CN | 106990912 A | 7/2017 |
| EP | 3197059 A1 | 7/2017 |

* cited by examiner

MEMORY CARD IDENTIFICATION METHOD AND MOBILE DEVICE

CROSS-REFERENCE TO RELATED APPLICATIONS

This application is a National Stage of International Application No. PCT/CN2019/096438, filed on Jul. 17, 2019, which claims priority to Chinese Patent Application No. 201811585279.9, filed on Dec. 24, 2018. Both of the aforementioned applications are hereby incorporated by reference in their entireties.

TECHNICAL FIELD

This application relates to the field of storage technologies, and in particular, to a memory card identification method and a mobile device.

BACKGROUND

Due to features such as a large storage capacity, portability, and a fast read/write speed, memory cards are supported by more and more terminal devices. Currently, after a memory card is inserted, a terminal device loads data to the memory card by using an identification program, to identify the memory card.

Taking an MMC card and an SD card as an example, when the MMC card and the SD card are being identified, a CMD8 command and an ACMD41 command are usually used to determine whether the SD card responds, so as to identify the SD card. This manner is implemented through two steps, and therefore is relatively slow and has relatively low identification efficiency.

SUMMARY

This application mainly provides a memory card identification method and a mobile device, to resolve a prior-art problem that different memory cards are identified at a relatively slow speed.

A manner used in this application is to provide a memory card identification method. The method includes: sending an initialization command of a first-type memory card communications protocol to a to-be-identified memory card; detecting whether there is a response in a command pin of the memory card; and identifying the memory card as a first-type memory card or a second-type memory card based on a response status of the command pin.

The step of identifying the memory card as a first-type memory card or a second-type memory card based on a response status of the command pin includes: identifying the memory card as the first-type memory card if there is a response; or identifying the memory card as the second-type memory card if there is no response.

After the step of identifying the memory card as the first-type memory card, the method further includes: initializing the first-type memory card by using the initialization command of the first-type memory card communications protocol. After the step of identifying the memory card as the second-type memory card, the method further includes: initializing the second-type memory card by using an initialization command of a second-type memory card communications protocol.

Before the step of sending an initialization command of a first-type memory card communications protocol to a to-be-identified memory card, the method further includes: sending a reset command shared by the first-type memory card communications protocol and the second-type memory card communications protocol to the command pin of the to-be-identified memory card, so that the to-be-identified memory card enters an idle state.

A first type memory card is an MMC card, and a second type memory card is an SD card.

The reset command is a CMD0 command.

Before the step of sending an initialization command of a first-type memory card communications protocol to a to-be-identified memory card, the method further includes: powering on the memory card.

Before the step of sending an initialization command of a first-type memory card communications protocol to a to-be-identified memory card, the method further includes: powering on a DAT3 pin of the to-be-identified memory card, so that the DAT3 pin is in a non-grounded state.

The initialization command is a CMD1 command.

A manner used in this application is to provide a mobile device. The mobile device includes a controller and a card slot, the card slot is configured to accommodate a memory card and electrically connect the memory card and the controller, and the controller is configured to identify the memory card by using the foregoing method.

The memory card identification method provided in this application includes: sending the initialization command of the first-type memory card communications protocol to the to-be-identified memory card; detecting whether there is a response in the command pin of the memory card; and identifying the memory card as the first-type memory card or the second-type memory card based on the response status of the command pin. In the foregoing manner, different from a prior-art manner of identifying an SD card through two steps by using a CMD8 command and an ACMD41 command, an MMC protocol type card is identified by using a protocol feature of the MMC card. This implementation can shorten an identification procedure and accelerate an identification speed.

BRIEF DESCRIPTION OF THE DRAWINGS

To describe technical solutions in embodiments of this application more clearly, the following briefly describes the accompanying drawings for describing the embodiments. It is clearly that the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

A memory card is an independent storage medium used in a mobile phone, a digital camera, a portable computer, MP3, and other digital products. The memory card is usually in a card form, and therefore is collectively referred to as a "memory card", also known as a "digital memory card", a "digital memory card", a "storage card", or the like.

Figure 1:
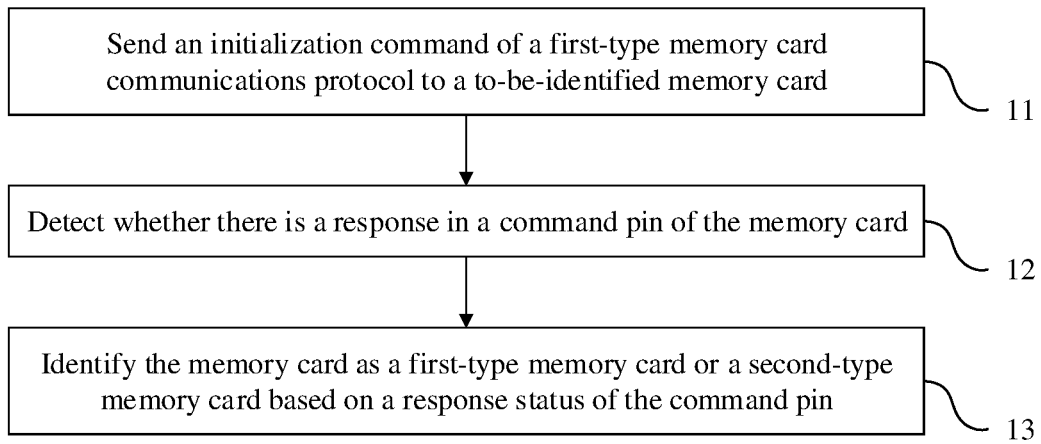
FIG. 1 is a schematic flowchart of a first embodiment of a memory card identification method according to this application.

FIG. 1 is a schematic flowchart of a first embodiment of a memory card identification method according to this application. The method includes the following steps.

Step 11: Send an initialization command of a first-type memory card communications protocol to a to-be-identified memory card.

Step 12: Detect whether there is a response in a command pin of the memory card.

It may be understood that this embodiment is mainly used for memory cards that use different communications protocols, and different communications protocols have different initialization manners.

For example, a communications protocol used by a first-type memory card is the first-type memory card communications protocol, and the initialization command of the first-type memory card communications protocol is a command A; and a communications protocol used by a second-type memory card is a second-type memory card communications protocol, and an initialization command of the second-type memory card communications protocol is a command B. Specifically, if the command A is sent to the to-be-identified memory card, only the first-type memory card responds, and the second-type memory card does not respond. Similarly, if the command B is sent to the to-be-identified memory card, only the second-type memory card responds, and the first-type memory card does not respond.

Step 13: Identify the memory card as a first-type memory card or a second-type memory card based on a response status of the command pin.

Different from the prior art, the memory card identification method provided in this embodiment includes: sending the initialization command of the first-type memory card communications protocol to the to-be-identified memory card; detecting whether there is a response in the command pin of the memory card; and identifying the memory card as the first-type memory card or the second-type memory card based on the response status of the command pin. In the foregoing manner, a prior-art problem that steps are complex when two commands are sent for identification is avoided, and an identification process of the memory card can be accelerated.

The following embodiments describe in detail the identification method of the present invention by using an example in which a first type memory card is an MMC card and a second type memory card is an SD card.

The SD card (Secure Digital Memory Card) is a new-generation memory device based on a semiconductor flash memory, and is characterized with a high memory capacity, a fast data transmission rate, great mobility, and high security. The SD card usually includes a standard SD card and a micro SD card.

The MMC is an abbreviation of MultiMediaCard, namely, a multimedia card. The MMC is a non-volatile storage device, is characterized with a small size, a large capacity, low power consumption, and a fast transmission speed, and is widely applied to consumer electronics. The MMC is an interface agreement (a card type), and a memory that conforms to this interface can be referred to as an mmc memory (mmc card).

The following describes an identification method of the MMC card and the SD card.

The MMC card has a total of seven pins, and the seven pins are classified into two operation modes: an MMC mode (also referred to as an MMC identification mode) and an SPI mode.

The MMC mode mainly includes the following three states:
1. Idle state: The MMC card enters the idle state after being reset.
2. Ready state: The MMC card enters the ready state after matching a voltage range.
3. Identification state: The MMC card enters the identification state after responding to a CID.

The pins of the MMC card are shown in the following table:

| Pin number | Name | Function (MMC mode) | Function (SPI mode) |
|---|---|---|---|
| 1 | RES/CS | Reset | Chip select |
| 2 | CMD/DI | Command | Master-Out-Slave-In |
| 3 | VSS1 | GND | GND |
| 4 | VDD | Power supply | Power supply |
| 5 | CLK | Clock | Clock |
| 6 | VSS2 | GND | GND |
| 7 | DAT/DO | Data | Master-In-Slave-Out |

The SD card has nine pins, and the nine pins are classified into two operation modes: an SD mode and an SPI mode. In this embodiment, the SD card is mainly run in the SD mode. Therefore, a DAT3 pin of the SD card cannot be grounded, so that the SD card can be prevented from being switched to the SPI mode. Specifically, a DAT3 pin of the to-be-identified memory card is powered on, so that the DAT3 pin is in a non-grounded state.

The pins of the SD card are shown in the following table:

| Pin number | Name | Function (SD mode) | Function (SPI mode) |
|---|---|---|---|
| 1 | DAT3/CS | Data 3 | Chip select |
| 2 | CMD/DI | Command | Master-Out-Slave-In |
| 3 | VSS1 | GND | GND |
| 4 | VDD | Power supply | Power supply |
| 5 | CLK | Clock | Clock |
| 6 | VSS2 | GND | GND |
| 7 | DAT0/DO | Data 0 | Master-In-Slave-Out |
| 8 | DAT1/IRQ | Data 1 | Reserved |
| 9 | DAT2/NC | Data 2 | Reserved |

Figure 2:
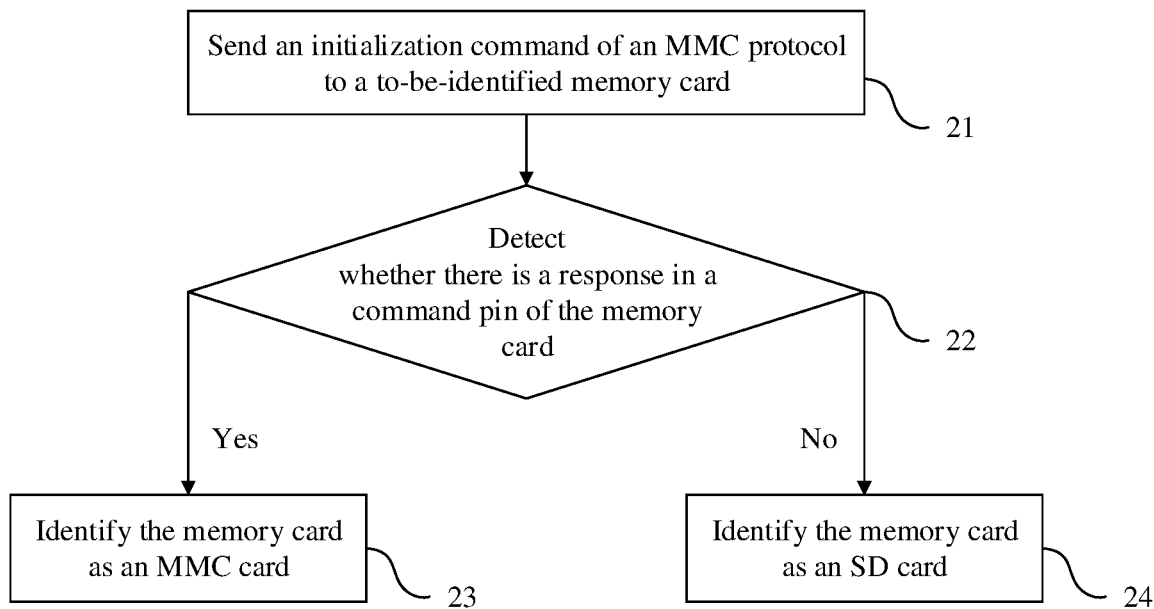
FIG. 2 is a schematic flowchart of a second embodiment of a memory card identification method according to this application.

FIG. 2 is a schematic flowchart of a second embodiment of a memory card identification method according to this application. The method includes the following steps.

Step 21: Send an initialization command of an MMC protocol to a to-be-identified memory card.

For pins of an MMC card and an SD card, refer to the foregoing descriptions. Details are not described herein again.

There are more than 40 commands of the MMC protocol, and the commands are classified into eight classes: Class0 to Class7. Commands in an SPI mode are a subset of commands in an MMC mode, but there are fewer commands in the SPI mode than in the MMC mode. A host distinguishes the MMC card and the SD card by sending a CMD1 command and a CMD41 command. The CMD1 command is sent, and if success information is returned, it indicates that the to-be-identified memory card is the MMC card. Otherwise, the CMD41 command is sent, and if success information is returned, it indicates that the to-be-identified memory card is the SD card.

Step 22: Detect whether there is a response in a command pin of the memory card.

If there is a response, step 23 is performed. If there is no response, step 24 is performed.

Step 23: Identify the memory card as an MMC card.

Step 24: Identify the memory card as an SD card.

Based on the foregoing principle, in this embodiment, whether there is a response in a CMD pin of the to-be-detected memory card is detected by sending a CMD1 command. The memory card is identified as the MMC card if there is a response. The memory card is identified as the SD card if there is no response.

Specifically, with reference to step 12, the detection manner in this embodiment is mainly to determine whether the to-be-identified memory card is the MMC card, and the foregoing command is responded to through the CMD pin. Therefore, only the seventh pin needs to be detected, and the to-be-identified memory card may be determined as the SD card if there is no response.

In addition, after the memory card is identified, a corresponding initialization procedure may be further performed on the memory card. Specifically, after the memory card is identified as the MMC card, the MMC card is initialized by using the initialization command of the MMC protocol. After the memory card is identified as the SD card, the SD card is initialized by using an initialization command of an SD protocol.

The memory card identification method provided in this embodiment includes: sending the initialization command of the MMC protocol to the to-be-identified memory card; detecting whether there is a response in the command pin of the memory card; and identifying the memory card as the MMC card or the SD card based on a response status of the command pin. In the foregoing manner, different from a prior-art manner of identifying an SD card through two steps by using a CMD8 command and an ACMD41 command, an MMC protocol type card is identified by using a protocol feature of the MMC card. This implementation can shorten an identification procedure and accelerate an identification speed.

Figure 3:
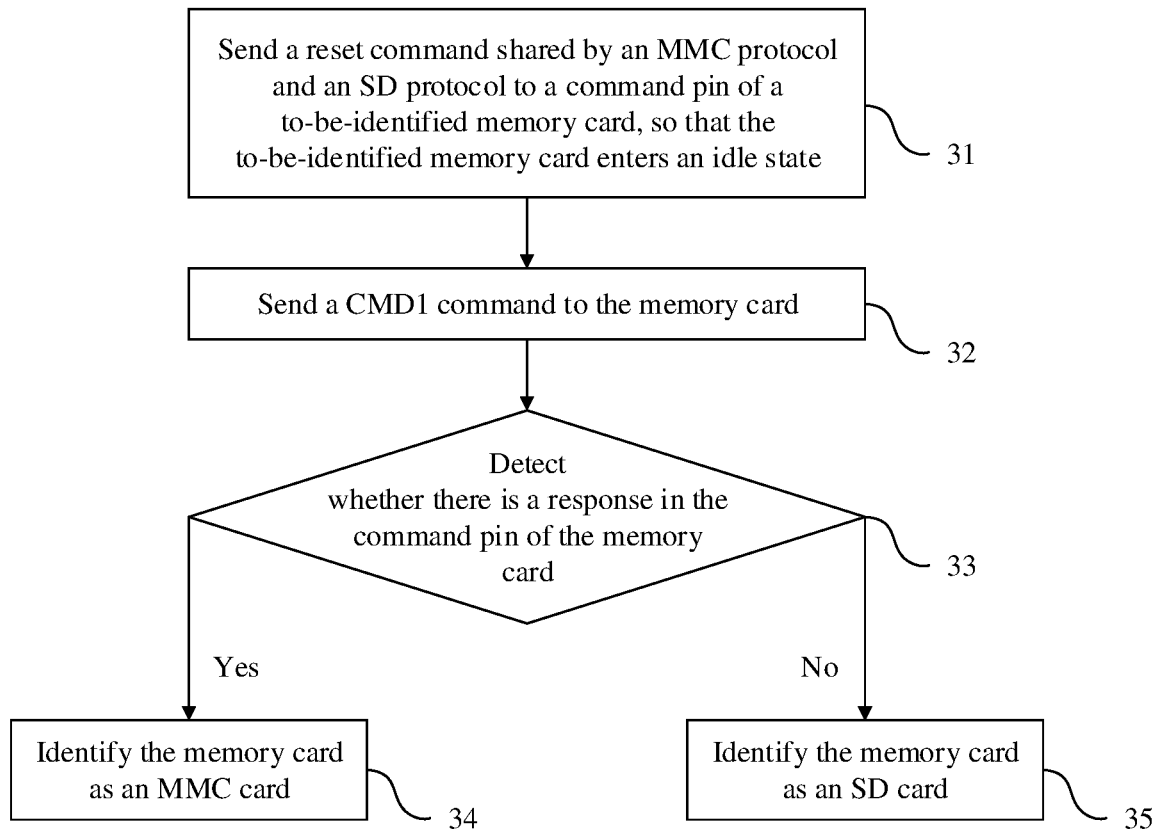
FIG. 3 is a schematic flowchart of a third embodiment of a memory card identification method according to this application.

FIG. 3 is a schematic flowchart of a third embodiment of a memory card identification method according to this application. The method includes the following steps.

Step 31: Send a reset command shared by an MMC protocol and an SD protocol to a command pin of a to-be-identified memory card, so that the to-be-identified memory card enters an idle state.

The reset command is a CMD0.

Step 32: Send a CMD1 command to the memory card.

Step 33: Detect whether there is a response in the command pin of the memory card.

If there is a response, step 34 is performed. If there is no response, step 35 is performed.

Step 34: Identify the memory card as an MMC card.

Step 35: Identify the memory card as an SD card.

Figure 4:
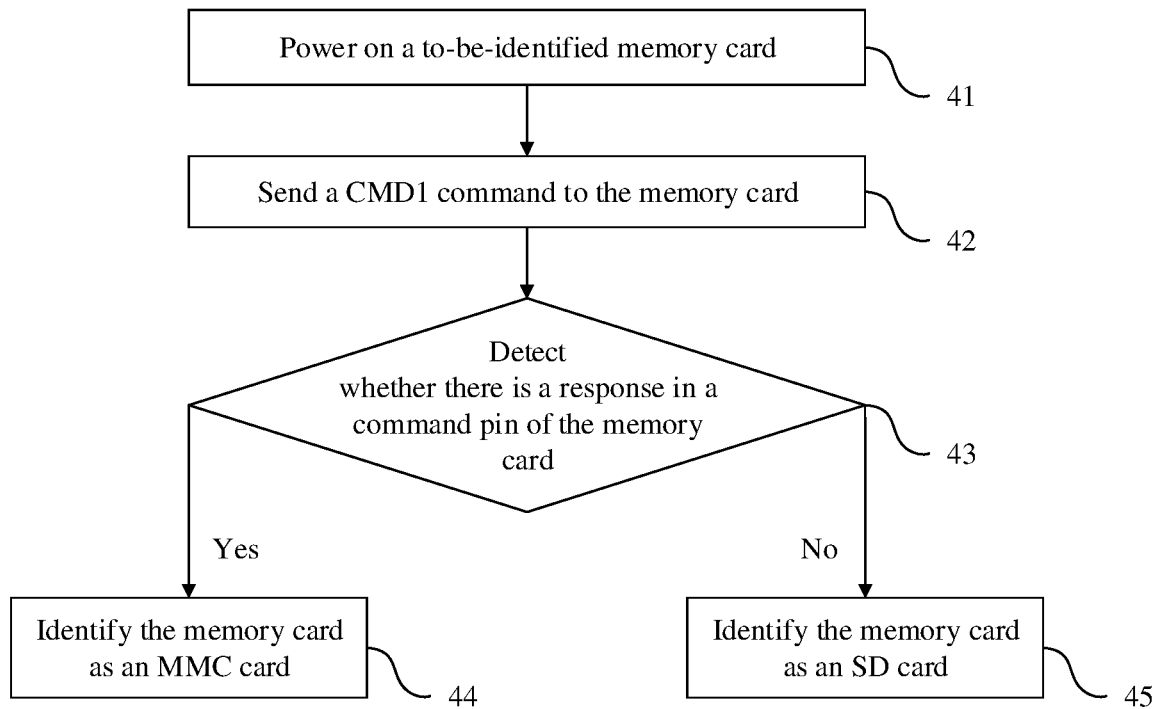
FIG. 4 is a schematic flowchart of a fourth embodiment of a memory card identification method according to this application.

FIG. 4 is a schematic flowchart of a fourth embodiment of a memory card identification method according to this application. The method includes the following steps.

Step 41: Power on a to-be-identified memory card.

It may be understood that, an operating voltage of an MMC card is 2.7 V to 3.6 V, an identification voltage is 1.8 V and 2.7 V to 3.6 V (power-on is performed at 3.3 V in most cases), and an operating voltage of an SD card is 3.3 V. In an identification process of the memory card, because identification is performed based on an MMC protocol in this embodiment, a voltage of 1.8 V or 3.3 V may be used in step 41 to ensure that the MMC protocol can be used for identification.

Optionally, in this step, the memory card is powered on by using a voltage of 3.3 V.

Optionally, between step 41 and step 42, the method may further include: sending a reset command shared by an MMC protocol and an SD protocol to a command pin of the to-be-identified memory card, so that the to-be-identified memory card enters an idle state.

The reset command is a CMD0.

Step 42: Send a CMD1 command to the memory card.

Step 43: Detect whether there is a response in a command pin of the memory card.

If there is a response, step 34 is performed. If there is no response, step 35 is performed.

Step 44: Identify the memory card as an MMC card.

Step 45: Identify the memory card as an SD card.

Figure 5:
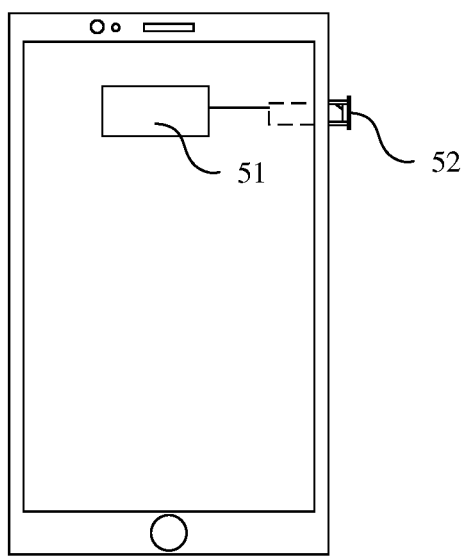
FIG. 5 is a schematic structural diagram of an embodiment of a mobile device according to this application.

FIG. 5 is a schematic structural diagram of an embodiment of a mobile device according to this application. A mobile device 50 includes a controller 51 and a card tray 52 that can be embedded into a body of the mobile device 50. A card slot 52a is disposed on the card tray 52. The card slot 52a is configured to accommodate a memory card and electrically connect the memory card and the controller 51. The controller 51 is configured to identify different types of memory cards in the foregoing manner.

Figure 6:
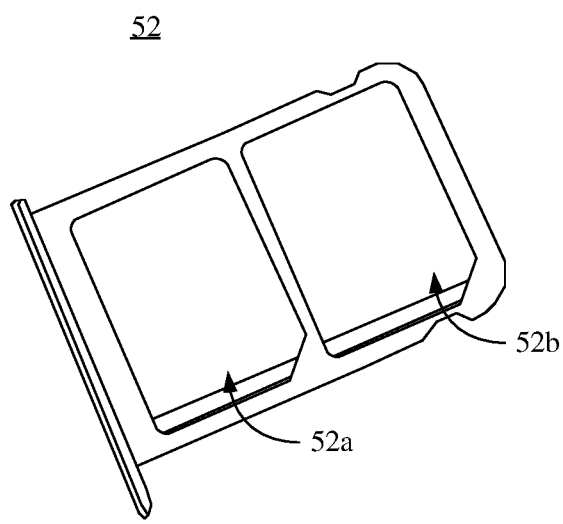
FIG. 6 is a schematic structural diagram of a card tray in an embodiment of a mobile device according to this application.

FIG. 6 is a schematic structural diagram of a card tray in an embodiment of a mobile device according to this application. A card tray 52 includes a first card slot 52a and a second card slot 52b, and a shape of the first card slot 52a is the same as that of the second card slot 52b. The first card slot 52a and the second card slot 52b are configured to accommodate a plurality of types of memory cards provided in the foregoing embodiment.

The mobile device may be a wearable device such as a mobile phone, a tablet computer, or a smartwatch.

In addition, the mobile device may further include a memory, configured to store program data. When the program data is executed by the controller 51, the foregoing identification method is implemented.

When a method provided in the embodiments of this application is implemented in a form of a software function unit and sold or used as an independent product, the method may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the implementations of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely implementations of this application, and are not intended to limit the scope of this application. An equivalent structural or equivalent process alternation made by using the content of the specification and drawings of this application, or an application of the content of the specification and drawings directly or indirectly to another related technical field, shall fall within the protection scope of this application.

What is claimed is:

1. A method, comprising:
    powering on a DAT3 pin of a to-be-identified memory card to be in a non-grounded state;
    while the DAT3 pin is in the non-grounded state, sending an initialization command of a first-type memory card communications protocol to the to-be-identified memory card;
    detecting whether there is a response to the initialization command in a command pin of the to-be-identified memory card, to determine a response status of the command pin; and
    identifying whether the to-be-identified memory card is a first-type memory card or a second-type memory card based on the response status of the command pin.

2. The method of claim 1, wherein identifying whether the to-be-identified memory card is the first-type memory card or the second-type memory card based on the response status of the command pin comprises:
    identifying the to-be-identified memory card as the first-type memory card in response to the response status of the command pin being that a response in the command pin of the to-be-identified memory card is detected; or
    identifying the to-be-identified memory card as the second-type memory card in response to the response status of the command pin being that no response in the command pin of the to-be-identified memory card is detected.

3. The method of claim 2, further comprising:
    after identifying the to-be-identified memory card as the first-type memory card, initializing the first-type memory card using the initialization command of the first-type memory card communications protocol.

4. The method of claim 2, further comprising:
    after identifying the to-be-identified memory card as the second-type memory card, initializing the second-type memory card using an initialization command of a second-type memory card communications protocol.

5. The method of claim 1, further comprising:
    before sending the initialization command of the first-type memory card communications protocol to the to-be-identified memory card, sending a reset command shared by the first-type memory card communications protocol and a second-type memory card communications protocol to the command pin of the to-be-identified memory card, to cause the to-be-identified memory card to enter an idle state.

6. The method of claim 5, wherein the reset command is a CMD0 command.

7. The method of claim 5, further comprising:
    before sending the initialization command of the first-type memory card communications protocol to the to-be-identified memory card, powering on the to-be-identified memory card.

8. The method of claim 1, wherein the first-type memory card is a MultiMediaCard (MMC) card, and the second-type memory card is a Secure Digital (SD) card.

9. The method of claim 1, wherein the initialization command is a CMD1 command.

10. A mobile device, comprising
    a controller; and
    a card tray, configured to be embeddable into a body of the mobile device;
    wherein the card tray comprises a card slot, the card slot is configured to accommodate a memory card, and to electrically connect the accommodated memory card and the controller, and wherein the controller is configured to:
    power on a DAT3 pin of a to-be-identified memory card, causing the DAT3 pin to be in a non-grounded state;
    while the DAT3 pin is in the non-grounded state, send an initialization command of a first-type memory card communications protocol to a to-be-identified memory card;
    detect whether there is a response to the initialization command in a command pin of the to-be-identified memory card, to determine a response status of the command pin; and
    identify whether the to-be-identified memory card is a first-type memory card or a second-type memory card based on the response status of the command pin.

11. The mobile device of claim 10, wherein identifying whether the to-be-identified memory card is the first-type memory card or the second-type memory card based on the response status of the command pin comprises:
    identifying the to-be-identified memory card as the first-type memory card in response to the response status of the command pin being that a response in the command pin of the memory card is detected; or
    identifying the to-be-identified memory card as the second-type memory card in response to the response status of the command pin being that no response in the command pin of the to-be-identified memory card is detected.

12. The mobile device of claim 11, wherein the controller is further configured to:
    after identifying the to-be-identified memory card as the first-type memory card, initializing the first-type memory card using the initialization command of the first-type memory card communications protocol.

13. The mobile device of claim 11, wherein the controller is further configured to
    after identifying the to-be-identified memory card as the second-type memory card, initialize the second-type memory card using an initialization command of a second-type memory card communications protocol.

14. The mobile device of claim 10, wherein the controller is further configured to:
    before sending the initialization command of the first-type memory card communications protocol to the to-be-identified memory card, send a reset command shared by the first-type memory card communications protocol and a second-type memory card communications protocol to the command pin of the to-be-identified memory card, to cause the to-be-identified memory card to enter an idle state.

15. The mobile device of claim 14, wherein the reset command is a CMD0 command.

16. The mobile device of claim 14, wherein the controller is further configured to:
   before sending the initialization command of the first-type memory card communications protocol to the to-be-identified memory card, power on the to-be-identified memory card.

17. The mobile device of claim 10, wherein the first-type memory card is a MultiMediaCard (MMC) card, and the second-type memory card is a Secure Digital (SD) card.

18. The mobile device of claim 10, wherein the initialization command is a CMD1 command.

* * * * *